(12) United States Patent
Tomita

(10) Patent No.: US 8,046,774 B2
(45) Date of Patent: Oct. 25, 2011

(54) JOB COMPLETION NOTIFYING DEVICE PROVIDING NOTIFICATION OF COMPLETION OF A JOB WHEN JOB EXECUTION IS COMPLETED

(75) Inventor: Kouichi Tomita, Osaka (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1013 days.

(21) Appl. No.: 11/480,418

(22) Filed: Jul. 5, 2006

(65) Prior Publication Data

US 2007/0245354 A1 Oct. 18, 2007

(30) Foreign Application Priority Data

Apr. 13, 2006 (JP) .................................. 2006-110982

(51) Int. Cl.
G06F 3/00 (2006.01)
G06F 11/00 (2006.01)
(52) U.S. Cl. ............................. 719/318; 714/39; 714/48
(58) Field of Classification Search .................. None
See application file for complete search history.

(56) References Cited

U.S. PATENT DOCUMENTS

| 6,592,275 | B1 * | 7/2003 | Aihara et al. ................... 400/62 |
| 2004/0046982 | A1 * | 3/2004 | Jeyachandran et al. ....... 358/1.13 |
| 2005/0134893 | A1 * | 6/2005 | Han ............................. 358/1.14 |
| 2005/0141005 | A1 * | 6/2005 | Maeda .......................... 358/1.13 |
| 2005/0147439 | A1 * | 7/2005 | Hirota et al. .................. 399/401 |
| 2006/0176497 | A1 * | 8/2006 | Kimura et al. ............... 358/1.13 |

FOREIGN PATENT DOCUMENTS

| JP | 11-194909 | 7/1999 |
| JP | 2002-091736 | 3/2002 |
| JP | 2002-204325 A | 7/2002 |
| JP | 2003-330635 | 11/2003 |
| JP | 2005-018140 A | 1/2005 |
| JP | 2005-297381 | 10/2005 |

* cited by examiner

Primary Examiner — Andy Ho
Assistant Examiner — Tuan Dao
(74) Attorney, Agent, or Firm — Buchanan Ingersoll & Rooney PC

(57) ABSTRACT

It is determined whether a job stored in an image forming apparatus is completed or not. When a result is YES, it is determined whether an uncompleted job of the same user as the completed job is present in a queue of the jobs. When a result is YES, it is determined not to perform notification. When the result is NO, it is determined to perform the notification. Thereby, completion notification is performed only when the last job is completed in the case where the queue contains the plurality of jobs of a certain user.

22 Claims, 9 Drawing Sheets

JOB HISTORY IN DEVICE

| No | Job ID | Status | User | Notified | Date | DocName |
|---|---|---|---|---|---|---|
| 1 | 000001 | complete | tom | TRUE | 2005/01/01 11:10:01 | test.doc |
| 2 | 000002 | complete | tom | FALSE | 2005/01/01 11:11:11 | hoge.xls |
| 3 | 000003 | complete | kon | FALSE | 2005/01/01 11:11:40 | fuga.ppt |
| 4 | 000004 | complete | tom | FALSE | 2005/01/01 11:12:00 | aaa.doc |

QUEUE IN DEVICE

| No | Job ID | User | Expected End Time | DocName |
|----|--------|------|-------------------|---------|
| 1 | 000004 | tom | 2005/01/01 11:12:00 | aaa.doc |
| 2 | 000005 | kon | 2005/01/01 11:13:00 | bbb.ppt |
| 3 | 000006 | tom | 2005/01/01 11:13:43 | ccc.Txt |

FIG.10

Form5

ALL PRINTING IS COMPLETED

LIST OF COMPLETED JOBS

| DOCUMENT NAME | STATUS | DATE & TIME | |
|---|---|---|---|
| fuga.ppt | Complete | 2005/01/01 11:11:11 | |
| bbb.ppt | Complete | 2005/01/01 11:12:00 | |

LIST OF JOBS OF OTHER USERS THAT MAY REMAIN ON DISCHARGE TRAY <<

| DOCUMENT NAME | USER | POSSIBILITY | SPECIFICATIONS |
|---|---|---|---|
| aaa.doc | tom | HIGH | BETWEEN fuga.ppt AND bbb.ppt |

FIG.11

Form7

PREDETERMINED TIME ELAPSED

LIST OF COMPLETED JOBS

| DOCUMENT NAME | STATUS | DATE & TIME | |
|---|---|---|---|
| hoge.xls | Complete | 2005/01/01 11:11:11 | |

LIST OF UNCOMPLETED JOBS

| DOCUMENT NAME | ESTIMATED FINISH TIME | |
|---|---|---|
| aaa.doc | 2005/01/01 11:12:00 | |

FIG.12

```
Form1                                          _ □ x
```

PAPER JAM OCCURRED
PAPER JAM OCCURRED DURING PRINTING OF ccc.txt

LIST OF COMPLETED JOBS

| DOCUMENT NAME | STATUS | DATE & TIME | |
|---|---|---|---|
| hoge.xls | Complete | 2005/01/01 11:11:11 | |
| aaa.doc | Complete | 2005/01/01 11:12:00 | |

UNCOMPLETED JOB(S): 1
ESTIMATED FINISH TIME OF ALL JOBS: 2005/01/01 11:13:43

LIST OF UNCOMPLETED JOBS <<

| DOCUMENT NAME | ESTIMATED FINISH TIME | |
|---|---|---|
| ccc.txt | 2005/01/01 11:13:43 | |

LIST OF JOBS OF OTHER USERS THAT MAY REMAIN ON DISCHARGE TRAY <<

| DOCUMENT NAME | USER | SPECIFICATIONS | |
|---|---|---|---|
| fuga.ppt | kon | BETWEEN hoge.xls AND aaa.doc | |

FIG.14

```
Form1                                              _ □ ×
┌─────────────────────────────────────────────────────┐
│              PRINTING IS COMPLETED                  │
│                                                     │
│   LIST OF COMPLETED JOBS                            │
│   ┌──────────────┬──────────┬──────────────────────┐│
│   │DOCUMENT NAME │ STATUS   │ DATE & TIME          ││
│   ├──────────────┼──────────┼──────────────────────┤│
│   │hoge.xls      │ Complete │ 2005/01/01 11:11:11  ││
│   │aaa.doc       │ Complete │ 2005/01/01 11:12:00  ││
│   └──────────────┴──────────┴──────────────────────┘│
│                                                     │
│   UNCOMPLETED JOB(S): 1                             │
│   ESTIMATED JOB COMPLETION TIME OF ALL JOBS: 2005/01/01 11:13:43│
│                                                     │
│   LIST OF UNCOMPLETED JOBS <<                       │
│   ┌──────────────┬──────────────────────┐           │
│   │DOCUMENT NAME │ ESTIMATED FINISH TIME│           │
│   ├──────────────┼──────────────────────┤           │
│   │ ccc.txt      │ 2005/01/01 11:13:43  │           │
│   └──────────────┴──────────────────────┘           │
│                                                     │
│   LIST OF JOBS OF OTHER USERS THAT MAY REMAIN ON DISCHARGE TRAY <<│
│   ┌──────────────┬──────┬───────────────────────────┐│
│   │DOCUMENT NAME │ USER │ SPECIFICATIONS            ││
│   ├──────────────┼──────┼───────────────────────────┤│
│   │fuga.ppt      │ kon  │ BETWEEN hoge.xls AND aaa.doc││
│   └──────────────┴──────┴───────────────────────────┘│
└─────────────────────────────────────────────────────┘
```

FIG.15

```
Form3                                              _ □ ×
┌─────────────────────────────────────────────────────┐
│              PRINTING IS COMPLETED                  │
│                                                     │
│   LIST OF COMPLETED JOB(S)                          │
│   ┌──────────────┬──────────┬──────────────────────┐│
│   │DOCUMENT NAME │ STATUS   │ DATE & TIME          ││
│   ├──────────────┼──────────┼──────────────────────┤│
│   │ fuga.ppt     │ Complete │ 2005/01/01 11:11:40  ││
│   │ bbb.ppt      │ Complete │ 2005/01/01 11:13:00  ││
│   └──────────────┴──────────┴──────────────────────┘│
└─────────────────────────────────────────────────────┘
```

JOB COMPLETION NOTIFYING DEVICE PROVIDING NOTIFICATION OF COMPLETION OF A JOB WHEN JOB EXECUTION IS COMPLETED

This application is based on Japanese Patent Application No. 2006-110982 filed with the Japan Patent Office on Apr. 13, 2006, the entire content of which is hereby incorporated by reference.

BACKGROUND OF THE INVENTION

1. Field of the Invention

The present invention relates to a job completion notifying device, and particularly to a job completion notifying device that notifies a user corresponding to a job of completion of the job when execution of the job is completed.

2. Description of the Related Art

A technique of providing notification of completion of printing has been employed for a system in which an image forming apparatus such as an MFP (Multi Function Peripheral) or a printer is connected to personal computers over a network. For providing notification of completion of printing, such a technique and the like have been known that provides notification of a status of an executed job in response to every executed job.

Japanese Laid-Open Patent Publication No. 2005-018140 has disclosed a technique in which IDs are allocated for providing notification of print completion, and it is determined according to the ID number whether there is an omission of notification or not. When an ID number is missing, it is determined that the printing is already completed, and the notification of completion is performed.

Japanese Laid-Open Patent Publication No. 2002-204325 has disclosed a technique of providing notification of print completion in a copy job.

In a conventional system of providing notification of the print completion, when a plurality of jobs are issued to an image forming apparatus, and are continuously executed, notification is performed in response to completion of each job, and therefore a user cannot readily determine timing for taking in printed matters.

SUMMARY OF THE INVENTION

The invention has been developed for overcoming the above problem, and it is an object to provide a job completion notifying device that can make notification of completion of a job according to appropriate timing.

For achieving the above object, a job completion notifying device according to an aspect of the invention includes a storing portion storing a plurality of jobs each related to a user for execution; a determining portion determining whether notification is to be performed or not when execution of the job stored in the storing portion is completed, depending on the unexecuted job stored in the storing portion and being the job not yet executed; and a notifying portion providing job completion notification indicative of the completion of the job to the user corresponding to the completed job being the job already executed, based on the determination of the determining portion.

According to another aspect of the invention, a job completion notifying device includes a determining portion obtaining information about completion of execution of a job and information about another job from an image forming apparatus, and determining whether notification is to be performed or not, depending on an unexecuted job being the job other than the completed jobs already subjected to the execution and being the job not yet executed; and a notifying portion providing job completion notification indicative of the completion of the job to the user corresponding to the completed job, based on the determination of the determining portion.

According to still another aspect of the invention, a job completion notifying device according to an aspect of the invention includes a storing portion storing a plurality of jobs each related to a user for execution; a producing portion producing notification contents when execution of the job stored in the storing portion is completed, depending on the unexecuted job stored in the storing portion and being the job not yet executed; and a notifying portion providing job completion notification indicative of the completion of the job to the user corresponding to the completed job being the job already executed, based on the notification contents produced by the producing portion.

According to another aspect of the invention, a job completion notifying device includes a producing portion obtaining information about completion of execution of a job and information about another job from an image forming apparatus, and producing notification contents depending on an unexecuted job being the job other than the completed jobs already subjected to the execution and being the job not yet executed; and a notifying portion providing job completion notification indicative of the completion of the job to the user corresponding to the completed job, based on the notification contents produced by the producing portion According to the invention, it is determined depending on the unexecuted job whether the notification is to be performed or not, and the contents of the notification are also produced depending on the unexecuted job. Thereby, it is possible to provide the job completion notifying device that can make notification of the completion of the job according to appropriate timing.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 shows a specific example of notification screen contents displayed on a display of a client personal computer according to a result of execution of the notification content producing processing in FIG. 7.

FIG. 11 shows a specific example of the notification screen contents displayed on the display of the client personal computer according to a result provided by execution of processing when a time exceeds a predetermined time in FIG. 8.

FIG. 12 shows a specific example of the notification screen contents displayed on the display of the client personal computer according to the result provided by the execution of processing when an error occurs in FIG. 9.

FIG. 14 shows a specific example of the notification screen contents displayed on the display of the client personal computer of a notification target user when a queue contains an uncompleted job of this user.

FIG. 15 shows a specific example of the notification screen contents that are displayed on the display of the client personal computer of the notification target user when a queue does not contain the uncompleted job of the notification target user.

DESCRIPTION OF THE PREFERRED EMBODIMENTS

First Embodiment

Figure 1:
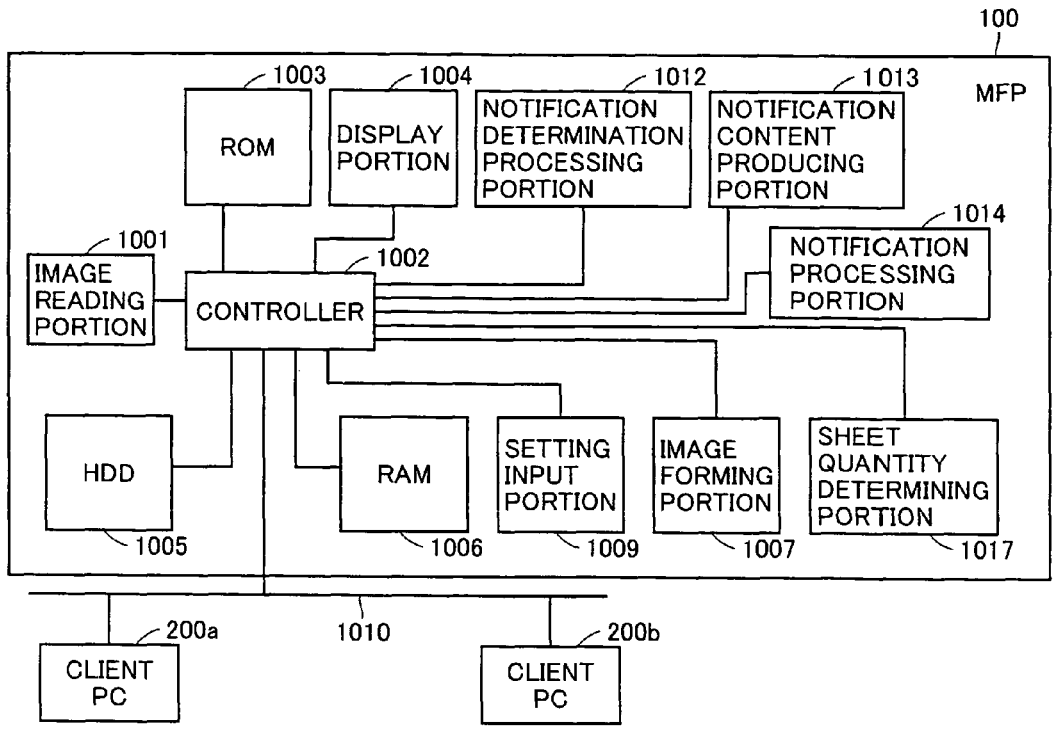
FIG. 1 is a block diagram illustrating a structure of an MFP 100 of a first embodiment of the invention.

Referring to FIG. 1, an MFP 100 includes a controller 102 controlling a whole device, an image reading portion 1001 formed of a scanner or the like and reading original images, an ROM 1003 storing programs and constants, a display portion 1004 displaying a state of the device and the like, a notification determination processing portion 1012 determining timing for providing or not providing notification about a state such as job completion, a notification content producing portion 1013 producing contents of the notification, a notification processing portion 1014 processing the notification, a hard disk drive 1005 storing image data and the like, an RAM 1006, a setting input portion 1009 receiving setting provided from a user, an image forming portion 1007 formed of a print engine or the like, and forming an image on a sheet of paper, and a sheet quantity determining portion 1017 determining a quantity of the sheets.

MFP 100 can be connected to client personal computers 200a and 200b over a network 1010.

Figure 2:
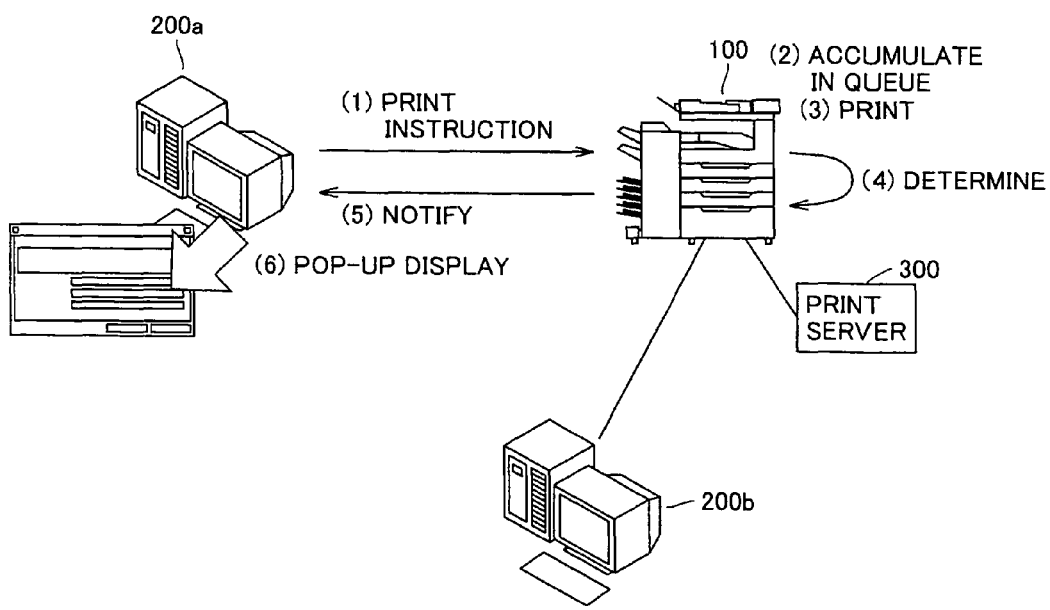
FIG. 2 illustrates operations of client personal computers and the MFP.

FIG. 2 illustrates operations of the client personal computers and the MFP.

When a print instruction is provided as indicated by (1) in FIG. 2 by transmitting a print job from client personal computer 200a to MFP 100, MFP 100 performs the print processing of this job. Thus, MFP 100 accumulates the job in a queue as indicated by (2). The queue can accumulate a plurality of jobs. As indicated by (3), MFP 100 successively executes (prints) the jobs in the queue.

As indicated by (4), MFP 100 determines timing whether the notification about the job is to be performed or not. When the notification is to be performed according to the determined timing, the notification is performed as indicated by (5). When the notification is performed, personal computer 200a displays the notification in a pop-up window on its display as indicated by (6).

A print server 300 may be connected to MFP 100 for determining notifications by print server 300.

In this embodiment, when the MFP continuously executes the jobs, the status notification about it can be performed with a high degree of efficiency. More specifically, in the case of continuously executing the printing, the print completion notification is provided to a user who instructs the printing when the last job is finished. As described above, it is determined whether notification of the print completion is to be provided or not, depending on the job remaining in the queue.

According to the above configuration, when the user's job still remains in the queue, the notification is not performed. Thereby, the user can receive the completion notification when the last job is completed.

Figures 3, 4:
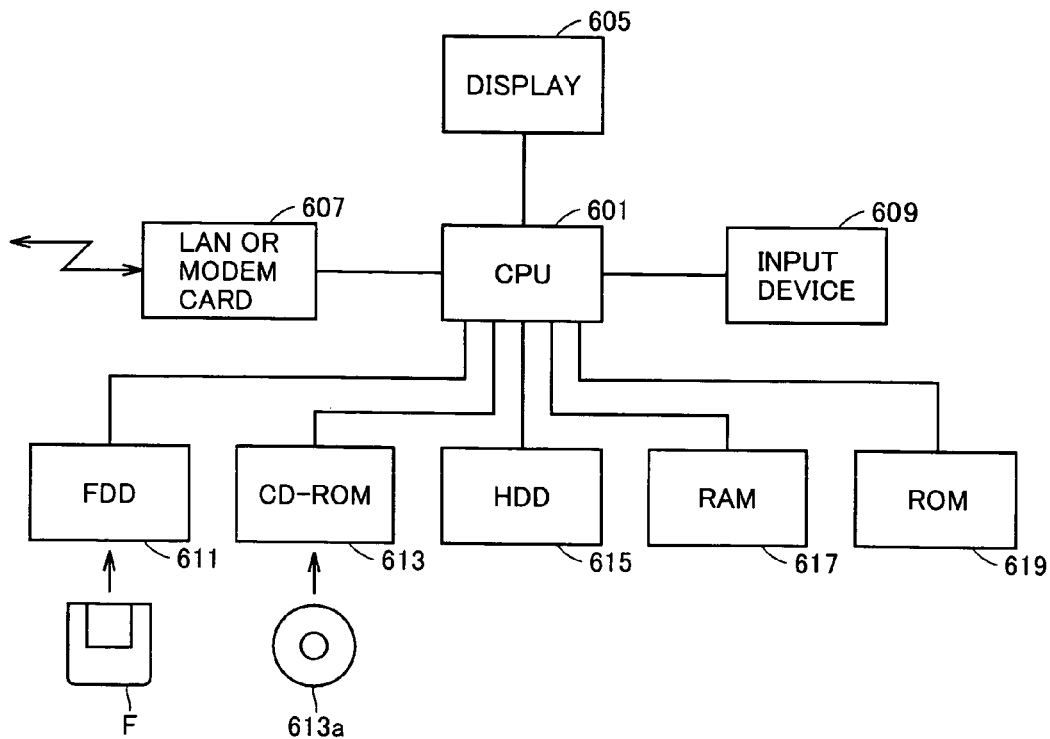
FIG. 3 is a block diagram illustrating a hardware structure of one client personal computer or one print server.
FIG. 4 illustrates job history information accumulated in a hard disk drive 1005 and an RAM 1006 of MFP 100.

FIG. 3 is a block diagram showing a hardware structure of one client personal computer or one print server.

Referring to FIG. 3, the client personal computer (or the server) includes a CPU 601 controlling the whole device, a display 605, an LAN (Local Area Network) card 607 (or a modem card) for connection to the network or external communications, an input device 609 formed of a keyboard and a mouse, a flexible disk drive 611, a CD-ROM drive 613, a hard disk drive 615, an RAM 617 and an ROM 619.

Flexible disk drive 611 can read data such as programs and images recorded on a flexible disk F, and CD-ROM drive 613 can read data such as programs and images recorded on a CD-ROM 613a.

FIG. 4 illustrates job history information accumulated in hard disk drive 1005 or RAM 1006 of MFP 100.

As illustrated in FIG. 4, IDs (job IDs) of completed jobs, states (status flags that attain "complete" when completed), users who executed the jobs, whether notification is provided to the user or not (Notified flag representing "TRUE" or "FALSE"), dates and times of completion and names of documents are recorded as the job history information.

When the "Notified" flag indicating whether the notification is already provided to the user or not is "TRUE", this indicates that the user is already notified of the completion of this job. When it is "FALSE", this indicates that the user is not notified of the completion of the job.

Figures 5, 6:
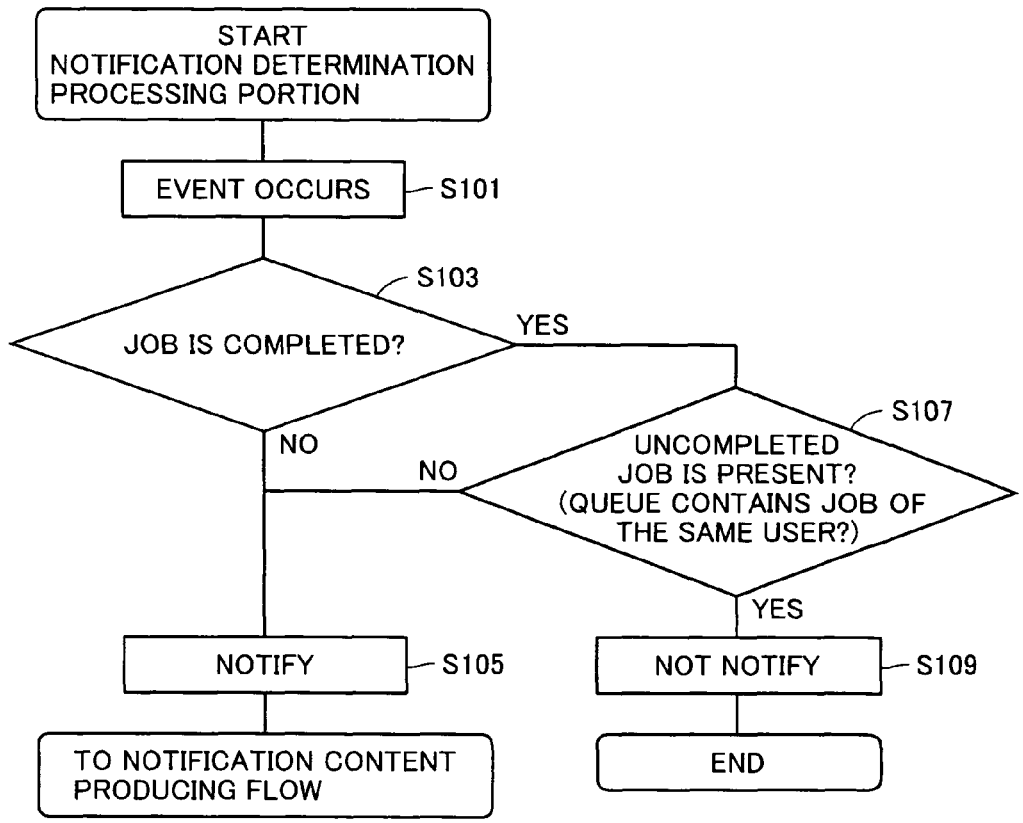
FIG. 5 illustrates a queue accumulated in hard disk drive 1005 and RAM 1006 of MFP 100.
FIG. 6 is a flowchart illustrating operations of a notification determination processing portion 1012.

FIG. 5 illustrates the queue accumulated in hard disk drive 1005 or RAM 1006 of MFP 100.

As shown in the figure, the IDs of jobs waiting for execution, users of the jobs, estimated dates and times of job completion and document names are recorded in the queue. Basically, jobs are executed in the order of occurrence thereof.

More specifically, when MFP 100 receives a print job from client personal computer 200, MFP 100 rasterizes it, assigns the job ID and writes it into the end of the queue (as the job to be executed latest) together with a publisher name (name of job user) and a document name obtained from the job included in the received print job. In this embodiment, the writing into the queue is performed after the rasterizing. However, the writing into the queue may be performed before the rasterizing. In this embodiment, since the job is written into the queue after the rasterizing, the date and time of job completion can be recognized more accurately, and these data and time of completion are also written into the queue. However, the manner is not restricted to this.

FIGS. 4 and 5 illustrate the situation at the time when the job of job ID of 000004 is just completed and is registered in the history of FIG. 4. Thereafter, the job of the job ID of 000004 is immediately erased.

A specific example of the notifying operation of MFP 100 will now be described.

When the job of job ID of 000004 in the queue (FIG. 5) is completed, notification determination processing portion 1012 determines whether the notification is required or not.

More specifically, it is determined whether the queue includes a job of the same user as the job of job ID of 000004 at this point in time or not.

In this example, since the job of the job ID of 000006 belongs to the same user ("tom"), the completion notification is not performed at this point in time. Since the notification is not yet performed for the completed job ID of 000004, the Notified flag of "FALSE" is added to the history (FIG. 4).

It is assumed that a job of a user "kon" bearing the job ID of 000005 in the queue (FIG. 5) is executed and completed. Notification determination processing portion 1012 determines whether the notification is required or not. More specifically, it is determined whether the queue includes a job of the same user as the job of the job ID of 000005 at this point in time or not. Since the queue does not include the job of the user "kon", it is determined that the completion notification is to be provided to the user "kon".

When it is determined that the completion notification is to be provided, notification content producing portion 1013 determines the information of notification. More specifically, it is determined with reference to the history (FIG. 4) that a job ID of 000003 indicates the job of the user "kon", and the Notified flag thereof is "FLASE" (not yet notified) so that the following processing steps (1)-(3) are performed.

(1) First, the job information relating to the job IDs of 000005 and 000003 is stored as the notification information, and the Notified flags of these jobs are changed to "TRUE". This is the processing of notifying "kon" of the completion of all the jobs when all the jobs of "kon" in the queue are completed, and recording the flag indicating that the notification is already performed.

(2) Since, a job (job ID: 000004) of another user "tom" is present after the job ID of 000003, the job information of the job ID of 000004 is then stored as the notification information. This is for the purpose of urging "kon" not to take in the job of a different user by mistake because the job of the different user "tom" is present between the jobs of "kon", and there is a possibility that a sheet of paper outputted by the job of the different user is mixed into the sheets outputted by the jobs of "kon".

(3) Then, the degree of warning of the job ID of 000004 is set to "high" because the Notified flag of the job ID of 000004 is "FALSE". Since the different user "tom" is not yet informed of the completion of the job of "tom" that was executed between the jobs of "kon", the above setting to "high" is performed for the purpose of notifying "kon" that there is a high possibility of mixing of the sheet outputted by the job of "tom" into the sheets outputted by the jobs of "kon" (i.e., a high possibility of leaving a printed matter on a discharge tray).

The information stored through the above (1)-(3) is provided to the user "kon".

Client personal computer 200a used by "kon" receives the notification information from MFP 100, and application software performing the completion notification based on it is recorded. This application displays the received notification information in a pop-up window.

Through the above processing, the notification can be performed according to appropriate timing with consideration given to the job of the other users. The processing in this embodiment is effective particularly in such a case that the jobs of the same user continue, or that a plurality of jobs of the same user are present, and a job of a different user is present between them (these jobs will be referred to as "continuous jobs" hereinafter).

Description will now be given on the case where an error occurs during execution of the continuous jobs.

For example, when the error occurs during the execution of Job ID of 000004 (the jobs of "tom") in the queue list (FIG. 5), notification that an error occurred in the job of Job ID of 000004 is immediately provided to the user "tom", independently of the other jobs in the queue list and history list (FIG. 4).

When the application performing the completion notification receives the notification information, it displays the received information in a pop-up window for the user. Thereby, the user can recognize the occurrence of the error.

Description will now be given on the case where a predetermined time of notification is set. This is set by a user or in a default setting for automatically notifying that a predetermined time has elapsed. This setting is based on the assumption that a large quantity of jobs enter (e.g., jobs taking 30 minutes or more are to be performed) during the processing, and therefore it may be desired to provide notification about even only the job(s) already completed. Thus, the notification is performed when a predetermined time elapses from any one of the time of job completion, the time of job transmission from the personal computer, the time of job reception by the MFP and the time of accumulation in the queue.

When a predetermined time elapses during execution of the job of job ID of 000004 in the queue list (FIG. 5), it is first determined whether a job of the same user as the job of job ID of 000004 is present in the queue or not.

(1) Since there are jobs of job IDs of 000004 and 000006, the job information of job IDs of 000004 and 000006 is stored as the notification information.

Then, the history list (FIG. 4) is determined to find the job(s) of the user in question and particularly the job(s) bearing the Notified flag of "FALSE". There are jobs of job IDs 000002 and 000004.

(2) Therefore, the job information of job IDs 000002 and 000004 is stored as the notification information.

The information in the foregoing items (1) and (2) is provided to the user "tom".

When the application performing the completion notification receives the notification information, it displays the received information in a pop-up window for the user. Thereby, the user can determine the job(s) that are not completed even when the predetermined time elapses as well as the job(s) already completed at this point in time.

FIG. 6 is a flowchart illustrating operations of notification determination processing portion 1012.

Referring to FIG. 6, when an event (job completion, predetermined time elapsing, error occurrence or the like) occurs in step S101, it is determined in step S103 whether the event of job completion occurred or not. When the result is YES, it is determined in step S107 whether an uncompleted job of the same user as the completed user is present in the queue or not. When the result is YES, it is decided not to perform the notification in step S109.

Figure 7:
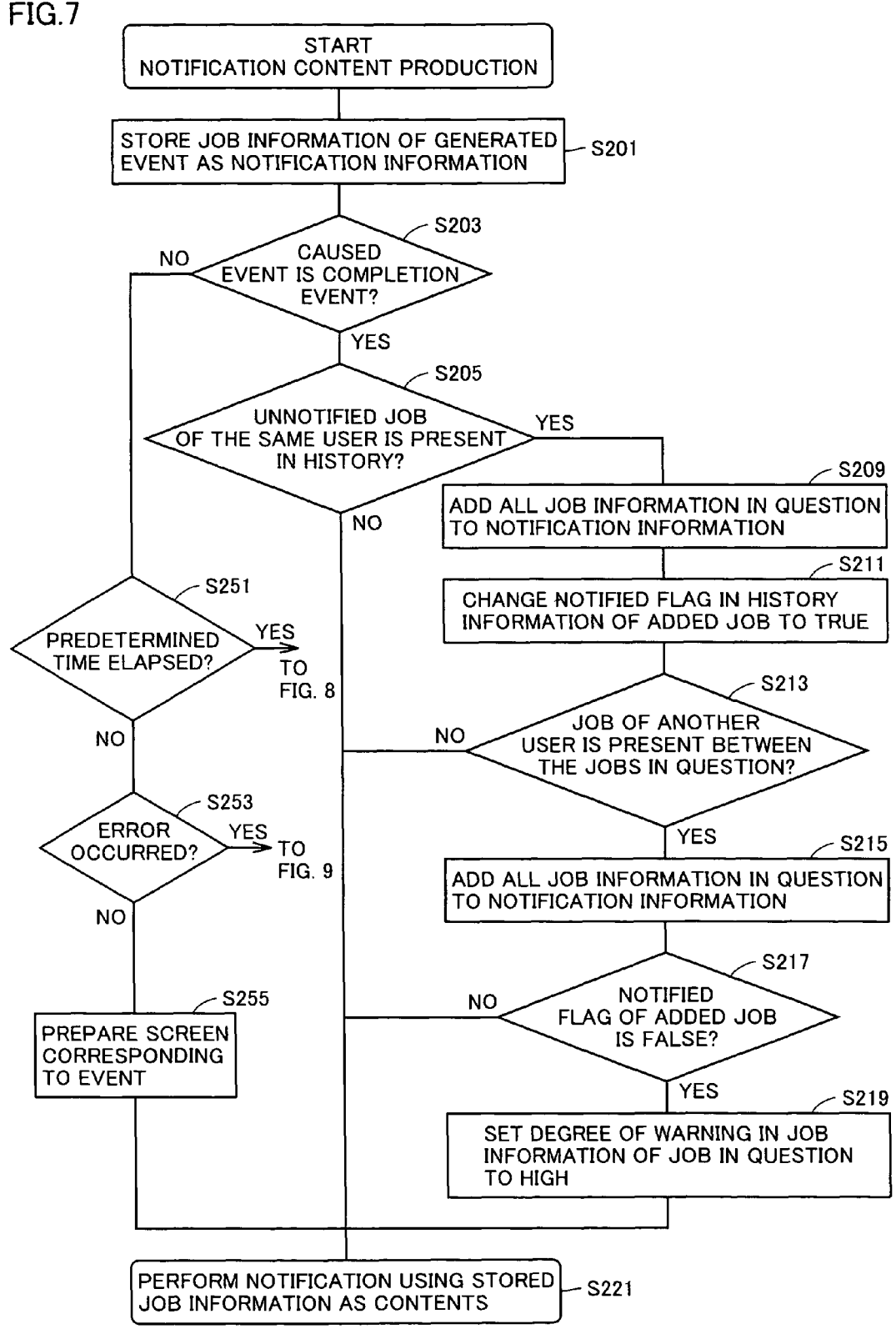
FIG. 7 is a flowchart illustrating operations of a notification content producing portion 1013 and a notification processing portion 1014.

When the result in step S103 is NO and the result in step S107 is NO, it is decided to perform the notification in step S105, and the process proceeds to the notification content producing flow (FIG. 7).

FIG. 7 is a flowchart illustrating operations of notification content producing portion 1013 and notification processing portion 1014.

In step S201, job information of the job of which event occurs is stored as the notification information (i.e., information to be provided to the user). In step S203, it is determined whether the generated event is the completion event of the job or not. When the result is NO, it is determined in step S251 whether the predetermined time for the event elapsed or not.

Figure 8:
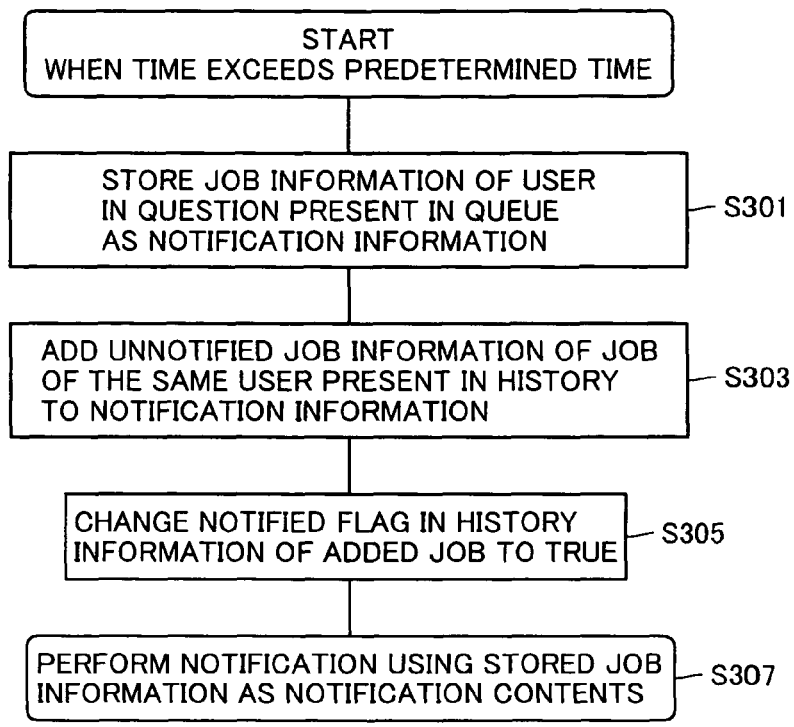
FIG. 8 is a flowchart illustrating processing performed by notification content producing portion 1013 and notification processing portion 1014 when a result is YES in step S251 in FIG. 7.

When the result is YES, processing in FIG. 8 is performed. When it is NO, the process proceeds to step S253.

Figure 9:
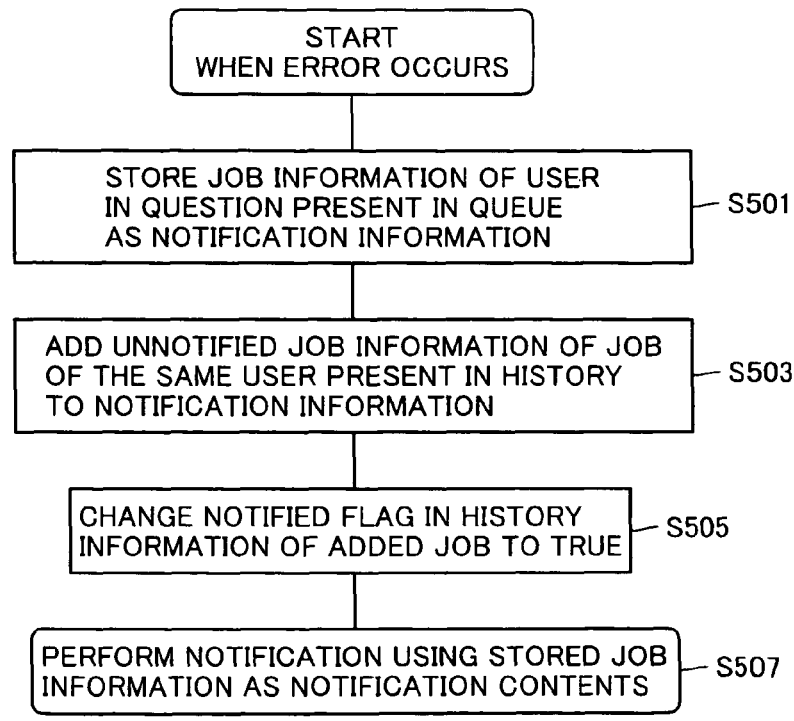
FIG. 9 is a flowchart illustrating processing performed by notification content producing portion 1013 and notification processing portion 1014 when a result is YES in step S253 in FIG. 7.

In step S253, it is determined whether the event is the error occurrence or not. When the result is YES, processing in FIG. 9 is performed. When the result is NO, screen contents corresponding to the event are prepared in step S255, and are stored as the job information. Thereafter, the stored job information is provided as the notification contents to the corresponding client personal computer in step S221.

When the result in step S203 is YES, it is determined in step S205 whether an unnotified job that belongs to the same user as the job corresponding to the event is present in the history or not. When the result is NO, the notification is made to the client personal computer in step S221 handling the stored job information as the notification contents.

When the result in step S205 is YES, the job information that is determined in step S205 as the unnotified job present in the history is added to the notification information. Thereafter, the Notified flag in the history information of the job thus added is set to "TRUE" (notified) in step S211.

In step S213, it is determined whether a job of a different user is present between the unnotified job determined or found in step S205 and the job corresponding to the event or not. When the result is NO, the process proceeds to step S221. When the result is YES, the process proceeds to step S215, in which information of all the job(s) thus determined are added to the notification information, and the notification is provided to the user.

After the processing in step S215, it is determined in step S217 whether the Notified flag of the job added in step S215 is "FALSE" (unnotified) or not. When the result is NO, the process proceeds to step S221. When it is YES, the degree of warning in the job information of the job in question is set to "high" in step S219, and the process proceeds to step S221.

FIG. 8 is a flowchart illustrating processing performed by notification content producing portion 1013 and notification processing portion 1014 when the result of step S251 in FIG. 7 is YES.

Referring to FIG. 8, the job information of the user in question that is present in the queue is stored as the notification information in step S301. In step S303, the information of the unnotified job of the user in question that is present in the history is added to the notification information. In subsequent step S305, the Notified flag of the history information of the job thus added is set to "TRUE" (notified).

Thereafter, the notification is executed in step S307 handling the stored job information as the notification contents.

FIG. 9 is a flowchart illustrating processing performed by notification content producing portion 1013 and notification processing portion 1014 when the result of step S253 in FIG. 7 is YES.

Referring to FIG. 9, the job information of the user in question that is present in the queue is stored as the notification information in step S501. In step S503, information of the unnotified job of the user in question that is present in the history is added to the notification information. In a subsequent step S505, the Notified flag of the history information of the added job is set to the "TRUE" (notified).

Then, the notification is executed in step S507 handling the stored job information as the notification contents.

FIG. 10 shows a specific example of notification screen contents displayed on a display of the client personal computer according to the result of execution of the notification content producing processing in FIG. 7.

As described above, when all the jobs of a certain user are completed, notification about the completed jobs of the user in question is performed. In this example, two jobs of fuga.ppt and bbb.ppt are completed jobs.

When there is a high possibility that the jobs thus completed contain the job(s) of the different user and the sheets outputted by the job(s) of the different user are mixed into the outputted sheets, the document name, user name and specifications (specific jobs between which the mixed job may be present) of each job are displayed. When the notification about the job of the different user has not been provided, it is displayed that the possibility of the job of the different user is "high".

In such a situation that it is not preferable to display the information of the job of the different user, the document name and the user name of the job of the different user may not be displayed. Only one of the document name and the user name of the job of the different user may not be displayed.

FIG. 11 shows a specific example of notification screen contents that are displayed on the display of the client personal computer according to the result of execution of the processing performed after the predetermined time in FIG. 8 elapsed.

When the predetermined time elapses, the user in question is notified of the completed and the uncompleted jobs of the user in question in a list form. For the uncompleted jobs, estimated finish times are displayed.

FIG. 12 shows a specific example of the notification screen contents that are displayed on the display of the client personal computer according to the result of the processing performed when an error in FIG. 9 occurs.

When the error occurs, the user in question is notified of the completed and uncompleted job(s) belonging to the user in question in the list form. When there is a high possibility that the jobs thus completed contain the job(s) of the different user, and the sheets outputted by the job(s) of the different user are mixed into the outputted sheets, the document name, user name and specifications (specific jobs between which the mixed job may be present) of each job are displayed.

Second Embodiment

Referring to FIGS. 4 and 5, a specific example of the notifying operation of MFP 100 in a second embodiment will now be described.

In the first embodiment already described, when another job of the same user is present in the queue, the notification is not performed. In the second embodiment, however, the notification is performed every time the job is completed. In this case, the contents of the notification are changed depending on whether a job of the same user as the completed job is present in the queue or not, when the job is completed. Description will now be given on the notification contents in the cases where the above job is present, and where the above job is not present.

<When the Job of the Same User is Present in the Queue>

It is now assumed that the job of job ID of 000004 in the queue (FIG. 5) is completed. In this case, notification content producing portion 1013 produces the notification contents as will be specifically described below.

(1) The job information of the last completed job of job ID of 000004 is stored as the notification information. It is determined at this point in time whether the job of the same user as the job of job ID of 000004 is present or not.

In this example, the job of job ID of 000006 belongs to the same user.

(2) Therefore, the job information of the job ID of 000006 is stored as the notification information.

The information of the above items (1) and (2) is provided to the user in question, i.e., "tom".

The application performing the completion notification receives the notification information, and displays the received information in a pop-up window for the user.

<When the Job of the Same User is not Present in the Queue>

It is now assumed that the job of job ID of 000005 in the queue (FIG. 5) is completed. In this case, notification content producing portion 1013 produces the notification contents as will be specifically described below.

(1) As the notification information, the job information of the last completed job ID of 000005 is stored. Since the job of the same user as the job of job ID of 000005 is not present, the following processing is performed.

The history (FIG. 4) is determined to find the job(s) of the user in question and particularly the job(s) bearing the Notified flag of "FALSE". The job of job ID of 000003 belongs to the job in question.

(2) The job information of the job ID of 000003 is stored as the notification information.

Then, it is determined whether there is a job of a different user after the job of the job ID of 000003 or not. The job (job ID of 000004) of a different user ("tom") is present.

(3) Therefore, the job information of the job ID of 000004 is stored as the notification information.

The information of the above items (1) and (2) is provided to "kon".

The application performing the completion notification receives the above notification information, and displays the received information in a pop-up window for the user.

Figure 13:
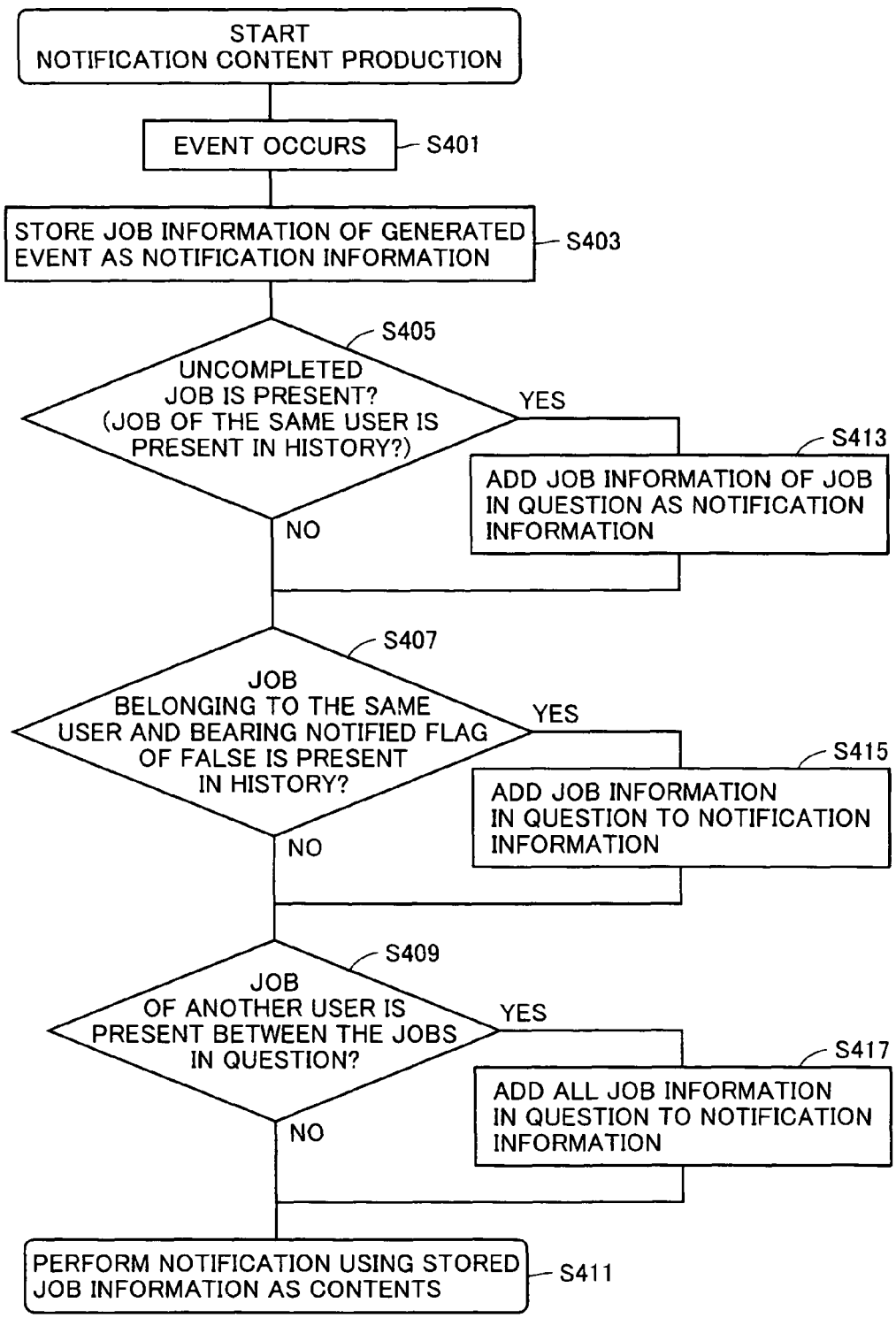
FIG. 13 is a flowchart illustrating operations of notification content producing portion 1013 in a second embodiment.

FIG. 13 is a flowchart illustrating operations of notification content producing portion 1013 in the second embodiment.

When an event occurs in step S401, job information of the job of which event occurs is stored as notification information (i.e., information to be provided to the user) in step S403. In step S405, it is determined whether the uncompleted job of the same user as the completed job is present in the queue or not. When the result is YES, the information of the uncompleted job is added as the notification information in step S413. When the result is NO, it is not added.

In step S407, it is determined whether the unnotified job belonging to the same user as the user of the job corresponding to the event is present in the history or not. When the result is YES, the information of this unnotified job is added as the notification information in step S415. When the result is NO, it is not added.

In step S409, it is determined whether a job of a different user is present between the jobs of the same user corresponding to the event or not. When the result is YES, information of the job of the different user is added as the notification information in step S417.

In step S411, the stored job information is provided as the notification contents to the corresponding client personal computer.

FIG. 14 shows a specific example of notification screen contents that are displayed on the display of the client personal computer of the notification target user when the queue contains an uncompleted job of this user.

When one job is completed, the notification about the completed and uncompleted jobs of the same user is provided in a list form. An estimated time of finish of the uncompleted job is displayed.

When there is a high possibility that the jobs thus completed contain the job(s) of the different user, and the sheets outputted by the job(s) of the different user are mixed into the outputted sheets, the document name, user name and specifications (specific jobs between which the mixed job may be present) of each job are displayed.

FIG. 15 shows a specific example of notification screen contents that are displayed on the display of the client personal computer of the notification target user when the queue does not contain an uncompleted job of this user.

When one job is completed, notification about all the completed jobs of the same user as this completed job is provided in a list form.

In this embodiment, as described above, the notification contents are changed according to the state of the queue (remaining jobs). In particular, when the job(s) of the user in question still remain in the queue, the notification information contains the information of the uncompleted job, and this achieves the effect that the user can recognize the appropriate timing for taking in the printed matters.

[Modification 1]

The processing of providing notification about the jobs may be performed by print server 300. The print server 300 receives the notification of print completion from the MFP, and also obtains the queue information and history information from the MFP. Based on this, the print server performs the notification processing.

The device may be configured such that the processing of providing notification about the job is performed by application software in the client personal computer. The application receives the notification of print completion from the MFP. The application receiving the notification obtains the queue information and the history information from the MFP receiving the completion notification. Based on this, the application software performs the notification processing.

[Modification 2]

In stead of the manner that the application obtains the queue information and the history information from the MFP and determines whether there is an uncompleted job or not, the device may be configured such that the application manages the job issuance history by itself, and performs the determination using the managed information.

However, when the queue information and history information are not obtained from the MFP, it is impossible to display the information about the job of the different user that is outputted between the jobs of the user in question.

[Modification 3]

The device may be configured such that the user can select the setting of "always notify immediately". This setting can be selected when executing the print. When this setting is selected, notification is immediately provided upon completion of the job even when an uncompleted job is present in the queue.

[Modification 4]

The device may be configured as follows. In the case of performing the information notification about the uncompleted job, sheet quantity determining portion 1017 (FIG. 1) determines the quantity of sheets remaining on a tray, and determines from the remaining sheet quantity and the number of sheets required for the jobs left in each queue whether a sufficient number of sheets required for executing the respective jobs remaining in the queue are left or not. When it is determined that sufficient sheets are not left, the device provides the information about it.

[Modification 5]

The foregoing embodiments are configured to write the data and time of job completion in the queue. These date and time of completion are obtained by adding the time required for executing the job and calculated based on the write job (i.e., the time calculated based on the number of print sheets, mode (i.e., single/double side(s), and monochrome/color)

and the like) to the date and time of completion of the last job already accumulated in the queue. However, the device may be configured to write the time required for executing the job. In this case, it is possible to provide notification of minutes that will elapse before completion of the job(s) (in other words, the estimated date and time of completion), based on the time required for executing each job. In this case, it may be naturally configured to provide notification of the estimated date and time based on the current time and the time required for executing each job.

[Modification 6]

The timing may be configured such that the Notified flag changes to "TRUE" after the actual notification (transmission of the information) is finished. Preferably, it is desired that the device changes the flag after the device performed the notification and then received a signal indicative of reception of the notification from the destination.

Effect of the Embodiments

According to the first embodiment, as described above, the device can determine according to the state of the queue (remaining jobs) whether the notification is to be performed or not, which results in an effect that the device can perform the notification according to the print completion timing that is appropriate for the user.

According to the second embodiment, the device can change the notification contents according to the state of the queue (remaining jobs), which results in an effect that the device can perform the appropriate notification according to the print completion timing that is appropriate for the user.

Thereby, according to the embodiment, the device can provide the completion notification indicative of the appropriate timing for taking in the printed matters without hindering progress of jobs of other users.

The foregoing processing may be performed by the personal computer, and may also be performed by either the computer of the image forming apparatus or the computer of the server.

The processing in the foregoing embodiments may be performed by software, and may also be performed by hardware circuits.

It may be configured to provide programs executing the processing in the foregoing embodiments. Such programs may be recorded on record mediums such as a CD-ROM, flexible disk, hard disk, ROM, RAM or memory card for providing them to the users. Further, the programs may be downloaded to the devices via communications network such as the Internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A job completion notifying device comprising:
a first memory configured to store a plurality of jobs waiting for execution, each job from the plurality of jobs being related to a user;
a second memory configured to store information of completed jobs as job history information, the job history information including identification of a user who executed the completed job and information of whether notification is provided to the user;
a first determining portion configured to determine when a first job of a first user stored in the first memory is completed, if a completed second job executed by the first user is present and if notification had not yet been provided, based on the job history information;
a second determining portion configured to determine, when the first determining portion determines that the completed second job is present, if a completed third job executed by a second user is present between the completed second job and the completed first job, based on the job history information; and
a notifying portion configured to provide notification to the first user when the second determining portion determines that the completed third job is present, the notification indicating completion of the completed jobs executed by the first user and indicating presence of the completed job executed by the second user.

2. The job completion notifying device according to claim 1, further comprising:
a job executing portion configured to successively execute the plurality of jobs stored in said first memory.

3. The job completion notifying device according to claim 1, wherein
the notifying portion does not provide the notification when an uncompleted job of the first user is stored in the first memory.

4. The job completion notifying device according to claim 1, wherein
the notifying portion provides the notification when there are no uncompleted jobs of the first user stored in the first memory.

5. The job completion notifying device according to claim 1, wherein
the notification includes information about the completed first job and the completed second job.

6. The job completion notifying device according to claim 1, wherein
when the notification of the completed third job is not yet performed, the notifying portion provides information indicating a high possibility of printed matter of the second user remaining on a discharge tray.

7. The job completion notifying device according to claim 1, further comprising:
an error detecting portion configured to detect an error, wherein
the notifying portion notifies the first user of error occurrence when the error is detected by the error detecting portion.

8. The job completion notifying device according to claim 1, wherein
the notifying portion provides the notification when a time longer than a predetermined time elapsed,
the notification including estimated finish time information of an uncompleted job.

9. A job completion notifying device connectable to an image forming apparatus comprising:
a receiving portion configured to receive completion information and job history information from memory of the image forming apparatus, the completion information indicating completion of a completed job, and the job history information including a user who executed the completed job and information of whether notification is provided to the user;
a first determining portion configured to determine, when the completion information indicating completion of a first job of a first user is received, if a completed second job executed by the first user is present and if notification had not yet been provided, based on the job history information;

a second determining portion configured to determine, when the first determining portion determines that the completed second job is present, if a completed third job executed by a second user is present between the completed second job and the completed first job, based on the job history information; and a notifying portion configured to provide notification to the first user when the second determining portion determines that the completed third job is present, the notification indicating completion of the completed jobs executed by the first user and indicating presence of the completed job executed by the second user.

10. A job completion notifying device comprising:

a first memory configured to store a plurality of jobs waiting for execution, each job from the plurality of jobs being related to a user;

a second memory configured to store information of completed jobs as job history information, the job history information including a user who executed the completed job and information of whether notification is provided to the user;

a first determining portion configured to determine, when a first job of a first user stored in the first memory is completed, if a completed second job executed by the first user is present and if notification had not yet been provided, based on the job history information;

a second determining portion configured to determine, when the first determining portion determines that the completed second job is present, if a completed third job executed by a second user is present between the completed second job and the completed first job, based on the job history information;

a producing portion configured to produce notification contents based on the determination by the second determining portion; and a notifying portion configured to provide notification including the notification contents produced by the producing portion to the first user.

11. The job completion notifying device according to claim 10, wherein the producing portion produces the notification contents based on whether an uncompleted job of the first user is present in the first memory.

12. The job completion notifying device according to claim 10, wherein when an uncompleted job of the first user is present in the first memory, the producing portion produces the notification contents containing job information of the first user.

13. The job completion notifying device according to claim 10, wherein the producing portion produces the notification contents with reference to the job history information.

14. The job completion notifying device according to claim 10, wherein the notifying portion also provides information of a job of the second user.

15. The job completion notifying device according to claim 10, wherein the notifying portion provides information of the plurality of completed jobs.

16. The job completion notifying device according to claim 10, wherein the notifying portion provides notification of an estimated time of completion of an uncompleted job.

17. A job completion notifying device connectable to an image forming apparatus comprising:

a receiving portion configured to receive completion information and job history information from memory of the image forming apparatus, the completion information indicating completion of a completed job, and the job history information including a user who executed the completed job and information of whether notification is provided to the user;

a first determining portion configured to determine, when the completion information indicating completion of a first job of a first user is received, if a completed second job executed by the first user is present and if notification had not yet been provided, based on the job history information;

a second determining portion configured to determine, when the first determining portion determines that the completed second job is present, if a completed third job executed by a second user is present between the completed second job and the completed first job, based on the job history information;

a producing portion configured to produce notification contents based on the determination by the second determining portion; and a notifying portion configured to provide notification including the notification contents produced by the producing portion to the first user.

18. An image forming apparatus comprising the job completion notifying device recited in claim 1.

19. A control method for a job completion notifying device providing notification about completion of a plurality of stored jobs each related to a user for execution, comprising:

a first determining step of determining if notification is to be performed when execution of a first job by a first user stored in a first memory is completed, depending on an unexecuted job being the job stored and not yet executed, wherein said first memory stores a plurality of jobs waiting for execution;

a second determining step of determining when the first determining step determines that a completed second job by the first user is present, if a completed third job executed by a second user is present between the completed second job and the completed first job of the first user, based on job history information stored in a second memory, said job history information including information of whether notification is provided to the users; and a notifying step of providing notification to the first user when the second determining step determines that the completed third job is present, the notification indicating completion of the completed jobs executed by the first user and indicating presence of the completed job executed by the second user.

20. A control method for a job completion notifying device providing notification about completion of a plurality of stored jobs each related to a user for execution, comprising:

a first storing step of storing, in a first memory, a plurality of jobs waiting for execution, each job from the plurality of jobs being related to a user;

a second storing step of storing, in a second memory, information of completed jobs as job history information, the job history information including a user who executed the completed job and information of whether notification is provided to the user;

a first determining step of determining, when a first job of a first user stored in the first storing step is completed, if a completed second job executed by the first user is present and if notification had not yet been provided, based on the job history information;

a second determining step of determining, when the first determining step determines that the completed second job is present, if a completed third job executed by a second user is present between the completed second job and the completed first job, based on the job history information;

a producing step of producing notification contents based on the determination by the second determining step; and a notifying step of providing notification including the notification contents produced by the producing step to the first user, based on the notification contents produced in said producing step.

21. A computer readable storage medium having stored thereon a control program product for a job completion notifying device providing notification about completion of a plurality of stored jobs, each related to a user for execution, for causing a computer to execute:

a first determining step of determining if notification is to be performed when execution of a first job by a first user stored in a first memory is completed, depending on an unexecuted job being the job stored and not yet executed, wherein said first memory stores a plurality of jobs waiting for execution;

a second determining step of determining, when the first determining step determines that a completed second job by the first user is present, if a completed third job executed by a second user is present between the completed second job and the completed first job of the first user, based on job history information stored in a second memory, said job history information including information of whether notification is provided to the users; and a notifying step of providing notification to the first user when the second determining step determines that the completed third job of the second user is present, the notification indicating completion of the completed jobs executed by the first user and indicating presence of the completed third job executed by the second user.

22. A computer readable storage medium having stored thereon a control program product for a job completion notifying device providing notification of completion about completion of a plurality of stored jobs, each related to a user for execution, for causing a computer to execute:

a first storing step of storing a plurality of jobs waiting for execution, each job from the plurality of jobs being related to a user;

a second storing step of storing information of completed jobs as job history information, the job history information including a user who executed the completed job and information of whether notification is provided to the user;

a first determining step of determining, when a first job of a first user stored in the first storing step is completed, if a completed second job executed by the first user is present and not yet notified, based on the job history information;

a second determining step of determining, when the first determining step determines that the completed second job is present, if a completed third job executed by a second user is present between the completed second job and the completed first job, based on the job history information;

a producing step of producing notification contents based on the determination by the second determining step; and a notifying step of providing notification including the notification contents produced by the producing step to the first user, based on the notification contents produced in said producing step.

* * * * *